UNITED STATES PATENT OFFICE

FRIEDRICH BRÄUNLICH, OF AUSSIG A/E, CZECHOSLOVAKIA, ASSIGNOR TO SOCIETY OF CHEMICAL INDUSTRY IN BASLE, OF BASEL, SWITZERLAND

PREPARATION OF NEW MOUTH WASHES AND DENTIFRICES

No Drawing. Application filed October 7, 1926, Serial No. 140,211, and in Czechoslovakia October 14, 1925.

My invention relates to the preparation of new mouth washes and dentifrices.

Apart from the mouth washes which are used to a large extent only because of their pleasant flavour, practically the only other preparations which come into question for treating the mouth and teeth are the various dental soaps and tooth pastes and powders containing more or less soap and in many cases also containing no soap. The effect obtained by these different preparations is due largely or exclusively to the mechanical action of the inorganic scouring agents contained therein, such as chalk, magnesia, pumicestone and the like, which action only in the case of the preparations containing soap, is assisted and improved—as regards the detrimental results of the purely mechanical scouring action—by the known cleansing properties of the added soap. Experience has shown that these preparations do not have a specific teeth cleansing action under the conditions in which they are used. They are more especially unable to prevent the deposit of "tartar" (deposits of insoluble calcareous salts combined with organic substances) which has such a destructive effect upon the teeth.

The object of the present invention is the use of sulphonated fats or of sulphonated fatty acids as well as of the alkali and ammonium salts of these compounds for producing very effective mouth and dental cleansing agents. Their specific action which is very pronounced in this respect is based:

1. On the strong dissolving capacity of these sulpho-fatty acid compounds both for fatty as well as for substances soluble in water, 2. On their specific capacity of dissolving tartar on the teeth or of preventing its formation, 3. On their great capacity for emulsifying, which enables them also to emulsify as colloids or convert into solutions impurities that are insoluble in themselves.

In addition, owing to their strong lipotropic properties, they have a more powerful disinfecting action than ordinary soaps, with which they have in common in the form of the alkali salts not only their chemical character, but also the property of being entirely harmless to the human organism and the vital cells.

The combination of these valuable properties makes the said sulpho-fatty acid compounds suitable as basis for the production of effective mouth washes and dentifrices, which, as has been found by lengthy observation, exert their specific properties to a full extent also under the conditions of daily use. They are applied either in the form of an addition to the usual mouth washes and dentifrices of any composition and nature or in a pure form in any desired degree of concentration.

According to one mode of carrying the invention into effect by way of example, 5 parts by weight of Turkey red oil are added to 95 parts by weight of a tooth paste of any desired composition and thereupon worked up to a further extent in a known manner.

According to another mode of carrying the invention into effect with the object of producing an agent which can be used at the same time as mouth wash and as a dentifrice, 96 parts by weight of Turkey red oil of 50% fat content, 2 parts by weight of peppermint oil and 2 parts by weight of aniseed oil are combined to form a liquid.

What I claim is:

1. A dentifrice having as an ingredient a salt of a sulphonated castor oil soluble in water.

2. A dentifrice comprised of a tooth paste containing Turkey red oil.

3. A dentifrice comprising 5 parts by weight of Turkey red oil and 95 parts by weight of a tooth paste.

In testimony whereof I affix my signature.

DR. FRIEDRICH BRÄUNLICH.